United States Patent
Kim

(10) Patent No.: US 11,481,813 B2
(45) Date of Patent: Oct. 25, 2022

(54) CONCIERGE SERVICE SYSTEM

(71) Applicant: Byoung Soo Kim, Yongin-si (KR)

(72) Inventor: Byoung Soo Kim, Yongin-si (KR)

( * ) Notice: Subject to any disclaimer, the term of this patent is extended or adjusted under 35 U.S.C. 154(b) by 0 days.

(21) Appl. No.: 17/603,020

(22) PCT Filed: Apr. 27, 2020

(86) PCT No.: PCT/KR2020/005536
§ 371 (c)(1),
(2) Date: Oct. 12, 2021

(87) PCT Pub. No.: WO2020/218907
PCT Pub. Date: Oct. 29, 2020

(65) Prior Publication Data
US 2022/0198522 A1    Jun. 23, 2022

(30) Foreign Application Priority Data

Apr. 26, 2019    (KR) .......... 10-2019-0048915

(51) Int. Cl.
*G06Q 30/02*    (2012.01)
(52) U.S. Cl.
CPC ..... *G06Q 30/0271* (2013.01); *G06Q 30/0203* (2013.01); *G06Q 30/0246* (2013.01)
(58) Field of Classification Search
CPC ........... G06Q 30/0271; G06Q 30/0203; G06Q 30/0246
See application file for complete search history.

(56) References Cited

U.S. PATENT DOCUMENTS

2014/0006218 A1*    1/2014    Muthu ............... G06Q 30/0601
705/26.8

FOREIGN PATENT DOCUMENTS

KR    10-2002-0006552 A    1/2002
KR    10-2007-0027687 A    3/2007
(Continued)

*Primary Examiner* — Breffni Baggot
(74) *Attorney, Agent, or Firm* — KORUS Patent, LLC; Seong Il Jeong

(57) ABSTRACT

The present invention relates to a method for providing information to a customer terminal of a user registered as a member, the method comprising: an authentication step of receiving information of the customer terminal through an authentication unit to check whether a customer has joined as a member; a first transmission step of transmitting an information list through a storage unit connected to the customer terminal; a guidance step of guiding through the information list by voice through an operation terminal connected to the customer terminal; a second transmission step of transmitting, to the customer terminal, information selected through the customer terminal from the information list through a guide unit connected to the customer terminal; and a third transmission step of transmitting a DM corresponding to the selected information through a DM processing unit connected to the customer terminal. According to the present invention, a concierge service is provided to the customer through a network, and a screen interface for guiding through the concierge service capable of remote control can be provided to the customer terminal, so that there is an effect that the customer can easily and conveniently enjoy the concierge service led by a concierge service operator.

4 Claims, 5 Drawing Sheets

(56) References Cited

FOREIGN PATENT DOCUMENTS

| | | | | |
|---|---|---|---|---|
| KR | 10-2007-0109241 A | | 11/2007 | |
| KR | 10-2009-0123579 A | | 12/2009 | |
| KR | 10-2013-0118669 A | | 10/2013 | |
| KR | 20130118669 A | * | 10/2013 | ............ G06Q 30/02 |
| KR | 10-2014-0001644 A | | 1/2014 | |
| KR | 10-2018-0054528 A | | 5/2018 | |

* cited by examiner

CONCIERGE SERVICE SYSTEM

FIELD OF THE INVENTION

The present invention relates to a concierge service system providing desired information to a user.

BACKGROUND OF THE INVENTION

Concierge service refers to a service such as a secretary who responds to client needs for their convenience. Korean Patent Application No. 10-2007-0027687, published on Mar. 9, 2007, proposes an e-commerce shopping method using an e-concierge station. The present inventor has researched technologies that enable clients to use concierge services easily and conveniently by providing concierge services to clients through a network, and enabling remote control of the screen interface provided to clients' terminals for concierge service guidance.

As social life becomes more complex and there is not enough time for people, an information providing service that researches and provides customized information required by clients, or an agency service that performs tasks that are difficult for clients to handle directly due to time or spatial constraints, are being introduced. For example, such customized information may include various travel information, entrance examination information, academy information, event information, concert information, gift information, restaurant information, etc. In addition, the tasks that the agency performs may include participation in various ceremonies, interpretation, concert/travel reservations, gift purchases, services for the elderly or the disabled, and class registration at private institutions.

Recently, in order to operate this information providing service or agency service, a dedicated membership service rather than a one-time service has been proposed, which is called a concierge service. One of the most important factors in achieving the effectiveness of such concierge services is the reliability of information provided through the service or base information for handling the agency work. If there is an error in the information provided through the concierge service, or if the quality of the agency service is lower than the required level due to errors or omissions in the base information for the service, the concierge service itself cannot be trusted by clients. Accordingly, it was necessary for the concierge service provider to accumulate various information, which is the base of the concierge service, and to secure accuracy and up-to-dateness of the information.

In this regard, as an example of the prior art related to the accumulation of information, Korean Patent Application No. 10-2009-0123579, published on Dec. 2, 2009, has been proposed. In the prior art, a user, as a non-expert, recommends information related to various valuable experiences, such as stories handed down through friends, family, and other acquaintances, based on a chart requested for recommendation to share wisdom, by certain methods such as adding items; evaluates the recommended information by certain methods such as a voting format and a ranking game; and suggests the verified chart evaluated by more than a certain number of public, as valuable information that gathers the wisdom of the public.

However, although the prior art improves the reliability of information through multiple verifications, there is a fundamental limit in applying it to a concierge service that provides customized information, or an agency service based on it. For example, the concierge service may handle information that cannot be disclosed to unspecified people. In this instance, there is a great risk in trusting information provided by unspecified people online without a direct verification process and providing it to members. In addition, the prior art has more limitations, in that the information required by the concierge service may be information that is not known to the general public or may be information that people do not want to disclose through online.

PRIOR ART

Patent Documents

Korean Patent Application No. 10-2007-0027687, published Mar. 9, 2007.

DETAILED DESCRIPTION OF THE INVENTION

Technical Problems

The present invention is suggested to provide a VIP concierge service system that provides concierge services to clients through a network, and enables remote control of the screen interface for concierge service guidance provided in clients' terminals.

In addition, the present invention is suggested to reduce time and cost used for shopping and searching information by cyclically exposing advertisements corresponding to information selected by a client and allowing the client to watch certain advertisements more relevant to their interest.

SUMMARY OF THE INVENTION

The present invention is a method of providing information to a client terminal of a user registered as a member, the method comprising: an authentication step receiving information from the client terminal through an authentication unit to confirm membership registration; a first transmission step transmitting an information list through a storage unit connected to the client terminal; a guide step guiding the information list by voice through an operation terminal connected to the client terminal; a second transmission step transmitting selected information from the information list through the client terminal to the client terminal through the guide unit connected to the client terminal; and a third transmission step transmitting a DM corresponding to the selected information through a DM processing unit connected to the client terminal.

Technical Effects of the Invention

According to the present invention, the concierge service system enables clients to use concierge services easily and conveniently by providing concierge services to clients through a network, and enabling remote control of the screen interface provided to clients' terminals for concierge service guidance under the instigation of the concierge service operator.

BEST MODE FOR THE INVENTION

Figure 1:
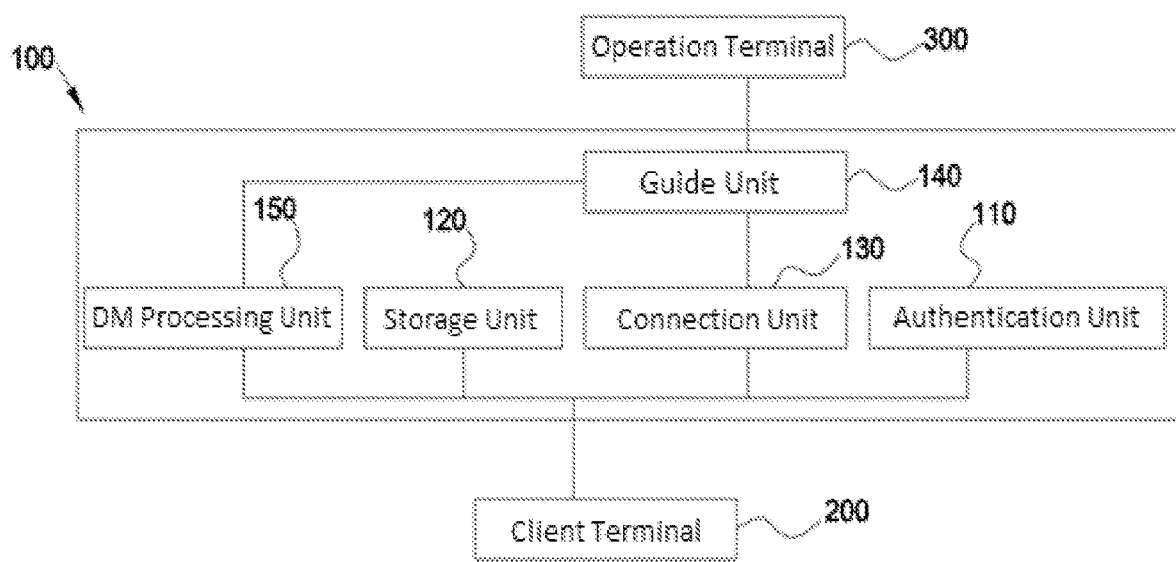
FIG. 1 is a drawing illustrating one embodiment of a VIP concierge service system according to the present invention.

A method of providing information to a client terminal of a user registered as a member, the method comprising:

an authentication step receiving information from the client terminal through an authentication unit to confirm membership registration;

a first transmission step transmitting an information list through a storage unit connected to the client terminal;

a guide step guiding the information list by voice through an operation terminal connected to the client terminal;

a second transmission step transmitting selected information from the information list through the client terminal to the client terminal through the guide unit connected to the client terminal; and a third transmission step transmitting a DM corresponding to the selected information through a DM processing unit connected to the client terminal.

DETAILED DESCRIPTION EMBODIMENTS OF THE INVENTIONS

Hereafter, the present invention will be described in detail in conjunction with the accompanying drawings so that one of ordinary skill in the art can easily implement the invention. The present invention may be embodied in different forms and is not limited to the embodiments disclosed below. In addition, in order to clearly disclose the present invention, parts irrelevant to the present invention are omitted the drawings, and the same or similar reference number in the drawings represents the same or similar components.

The purposes and effects of the present invention can be naturally understood or made clearer by the following description, but are not limited only by the following description.

The purposes, features, and advantages of the present invention will be clarified by the following detailed description. Furthermore, in the description of the present invention, if detailed description of well-known technologies related to the present invention unnecessarily obscures the gist of the present invention, the detailed description thereof will be omitted. Hereinafter, embodiments according to the present invention will be described in detail with reference to the accompanying drawings.

The present invention relates to a system that authenticates access of a client terminal, collects, and accumulates personal information of the client, such as emotion information, collects and accumulates a purchase history of the client, extracts characteristics of the client based on the accumulated personal information of the client, creates a concierge service list for the client through this process, and provides the created concierge service list of to the client.

FIG. 1 is a drawing illustrating one embodiment of a VIP concierge service system according to the present invention.

As shown in FIG. 1, a VIP concierge service system 100 according to this embodiment may comprise an authentication unit 110, a storage unit 120, a connection unit 130, a guide unit 140, and a DM processing unit 150.

The authentication unit 110 authenticates access of the client terminal 200. The client terminal 200 may be a communication terminal capable of internet access and voice call connection, such as a smart phone or a personal computer through which internet calling is available.

For example, when a client accesses the VIP concierge service system through the client terminal 200, the authentication unit 110 provides a user interface for inputting a user ID and password to the client terminal 200, the client terminal 200. When a user ID and password are input, the authentication unit 110 may search a prestored VIP member DB and confirm whether a client corresponding to the input user ID and password exists in the DB.

The storage unit 120 provides a list of concierge services to the client terminal 200 authenticated by the authentication unit 110. Specifically, the storage unit 120 transmits an information list including information that the client wants, to the client terminal 200. In this instance, the information list provided by the storage unit 120 may include at least one of a medical/health/well-being service, a travel/sports/leisure service, a shopping service, a culture/art/event service, a legal/tax service, or a life/convenience service. In addition, an information list of other various services may be provided.

When certain concierge information is selected by the client terminal 200, which receives the list of concierge services provided by the storage unit 120, the connection unit 130 provides a voice call between the client terminal 200 and an operating terminal 300. For example, if the information list in the form of a thumbnail is provided to the client terminal 200 by the storage unit 120, certain concierge information desired to be guided may be selected through a keyboard control, a mouse control, or a touch screen control of the client terminal 200 by the client. When the certain concierge information is selected by the client terminal 200, the connection unit 130 connects the voice call between the client terminal 200 and the operation terminal 300, thereby enabling to provide voice guidance regarding the selected concierge information to the client through the voice call. In this instance, the connection unit 130 may function as an exchange device of a voice call connecting between the client terminal 200 and the operation terminal 300, in a method of an internet calling or a method of mobile communication.

The guide unit 140 provides a remote control screen interface to the client terminal 200 connected to the voice call through the connection unit 130, to guide the concierge information selected by the client terminal 200. In this instance, when information is selected by the client terminal 200, a prestored client program for executing the remote control screen interface is transmitted to and installed on the client terminal 200. Then, the remote control screen interface is executed through the program, and the remote control screen interface may be controlled by the guide unit 140. For example, the guide unit 140 may be embodied to provide a guide screen regarding the information selected through the remote control screen interface. In another embodiment of the present invention, the guide unit 140 may be embodied to provide a payment screen for the information selected through the remote control screen interface. In this case, the payment screen for the selected information may be a credit card payment screen. For example, if a medical/health/well-being service is selected as a concierge service through the client terminal 200, a voice guidance related to the medical/health/well-being service may be provided to the client through a voice call, and a guidance screen related to the medical/health/well-being service may be provided to the client through the remote control screen interface. Accordingly, the present invention enables a client to use concierge services easily and conveniently by providing concierge services to the client through a network, and enabling remote control of the screen interface provided to the client terminal for concierge service guidance.

Figure 2:
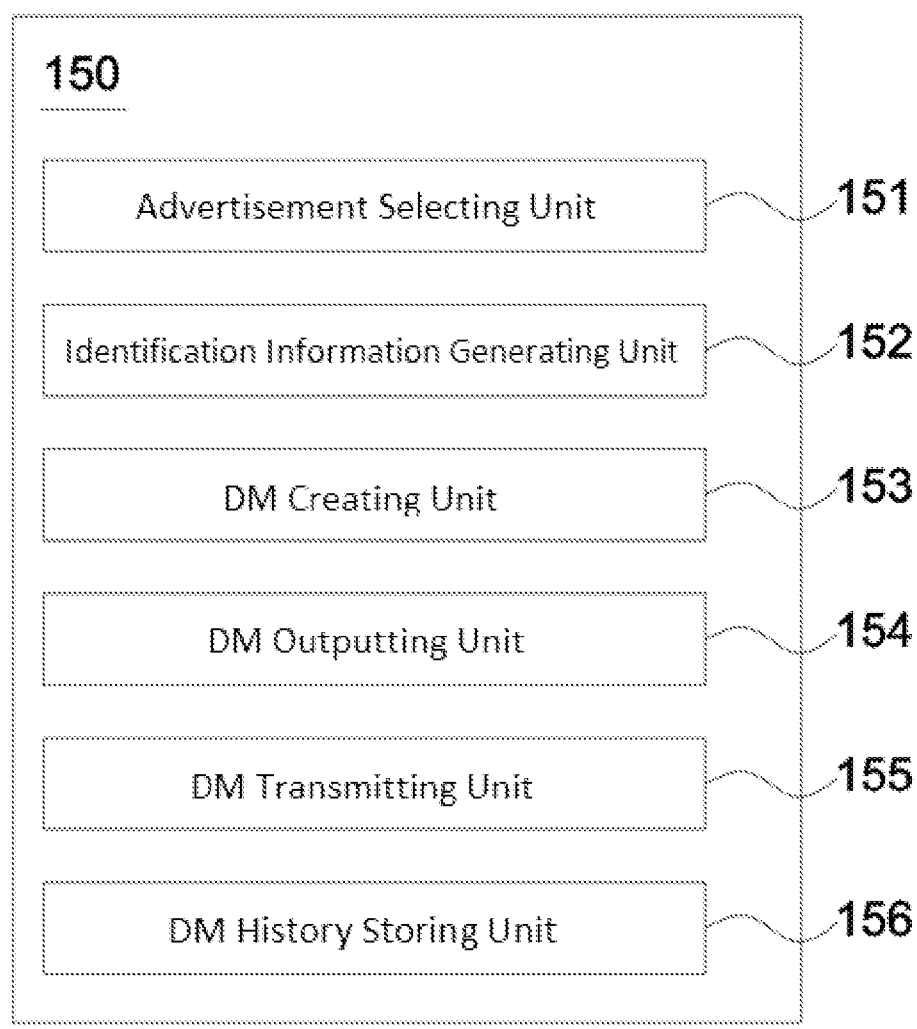
FIG. 2 is a drawing illustrating a DM processing unit 150 according to the present invention.

FIG. 2 is a drawing illustrating a DM processing unit 150 according to the present invention.

The present invention further includes a DM processing unit 150. The DM processing unit 150 is configured to transmit a direct mail (DM) to the client terminal 200. Specifically, the DM processing unit 150 transmits a DM corresponding to the information selected through the client terminal 200 to the client terminal 200. The DM processing unit 150 is connected to the client terminal 200, and may include an advertisement selecting unit 151, an identification information generating unit 152, a DM creating unit 153, a DM outputting unit 154, and an DM transmitting unit 155, and a DM history storing unit 156.

The advertisement selecting 151 is configured to select a certain advertisement among a plurality of advertisements provided in the DM processing unit 150 according to a prestored advertisement circulation rule r. In this case, the advertisement means an advertisement that is included in the DM on a prestored periodic basis, such as 1 day or 3 days.

The advertisement circulating rule r is a rule for selecting an advertisement to be included in the DM. The advertisement circulating rule r is prestored in the advertisement selecting unit 151, and includes the first rule r1, the second rule r2, and the third rule r3.

The first rule r1 is a rule for selecting an advertisement to be transmitted to the client terminal 200 with the highest priority. The advertisement's ranking based on the number of views by the client terminal 200 is divided by the total number of advertisements provided in the DM processing unit 150. Advertisements whose divided value falls within a predetermined first ratio c10 in high rank are selected and included in the DM. Accordingly, the advertisements included in the DM transmitted to the client terminal 200 are selected by a large number of other client terminals 200. Therefore, the highly reliable advertisement can be accessed first, thereby providing convenience to users who want more accurate information.

The second rule r2 is based on the total number of advertisements excluding the advertisement selected in the first rule. The advertisement's ranking based on the number of views by the client terminal 200 is divided by the total number of advertisements excluding the advertisement selected in the first rule. Advertisements whose divided value falls within a predetermined second ratio c20 in low rank are selected. For example, 90% of advertisements, which excludes the advertisements selected through the first rule r1 in which the first ratio c10 is 10% among all advertisements, is used in the second rule r2 in which the second ratio c20 is 10%. The advertisements selected through the second rule r2 are transmitted and exposed to the client terminal 200. The 80% of the total advertisements are rearranged and guided through a third rule, which will be described later. Since the second rule is provided, even advertisements with a low number of views by the client terminal 200, for the reason that the posting date of advertisement is relatively early, may be included and exposed in the DM.

The third rule r3 is based on the total number of advertisements excluding the exposed advertisement through the first rule r1 and second rule r2. The third rule r3 exposes advertisements whose posting elapsed day d1 is smaller than preset reference elapsed day d0 among the advertisements excluding the exposed advertisements based on the first rule r1 and second rule r2, and whose posting elapsed day 1 falls within a third ratio c10 among advertisements excluding the exposed advertisements by the first rule r1 and second rule r2. The advertisements selected by the third rule r3 are to be included in the DM. That is, the third rule r3 is an advertisement circulation rule r that is not included in the first and second rule r1, r2, and enabling the advertisements to be included in the DM. For this configuration, the advertisement selecting unit 151 includes a prestored reference elapsed day d0, identifies an elapsed posting day d1 of each of the plurality of advertisements, and determines whether or not the advertisement is displayed periodically, based on the comparison result between the reference elapsed day d0 and the posting elapsed date d1. For example, if the reference elapsed day d0 is provided as 7 days, advertisements whose posting elapsed day d1 are smaller than the reference elapsed day d0 occupy 50% of all the advertisements excluding the advertisements selected through the first and second rule, and the preset third ratio is 30%, the advertisement selecting unit 151 selects advertisements that fall within 30% of the total advertisements excluding ones selected through first and second rule, based on the order in which the posting date is late. With the third rule, it is possible to induce readvertisement by excluding advertisements with relatively old posting dates, and to promote advertisers to present new advertisements.

As another embodiment of the present invention, the advertisement circulation rule r classifies all client terminals 200 that receive the DM, by their addresses or sending locations. Then, the client terminals 200 classified by regions may be equally divided by the number of advertisers or the number desired by the advertiser. After that, the client terminals 200 for each region are randomly selected, and the advertisement of each advertiser can be sent only to the selected client terminals 200.

The identification information generating unit 152 generates unique identification information for identifying the advertisement and the client terminal 200. In this instance, the unique identification information may be a bar code or a QR code. In addition, the unique identification information may be embodied in various forms capable of identifying advertisements and client terminals 200, such as a unique serial number or identification ID. Meanwhile, the unique identification information may be embodied in a form that advertisement identification information and client terminal 200 identification information are combined with each other.

The DM creating unit 153 arranges DM content information, circular advertisements selected by the advertisement selecting unit 151, and the unique identification information generated by the identification information generating unit 152 in different areas of a DM frame, thereby creating a DM. In this case, the DM content information is information provided by a DM requesting company. For example, information may be department store card usage history included in the department store card usage DM provided by department stores, event guide information included in the event guide DM, and information regarding the client terminal 200 such as client name.

The DM outputting unit 154 outputs the DM created by the DM creating unit 153. In this case, the DM outputting unit 154 may output the DM in a form of specific image file or in a form of printing paper through a printer.

The DM transmitting unit 155 transmits the DM output by the DM outputting unit 154 to the client terminal 200. In this case, the DM transmitting unit 155 may transmit the DM online or to send it offline.

The DM history storing unit 156 stores the DM transmission history by matching and storing the unique identification information included in the DM transmitted by the DM transmitting unit 155 with the client terminal 200 that will receive the DM. This can prevent confusion and erroneous transmission in advance, which may occur during a transmission and reception process of DM.

As the client views the circulation advertisement included in the DM that has been transmitted by the DM transmitting unit 155 through the client terminal 200, the advertiser can provide their advertisement with a relatively inexpensive expense through this DM, and accordingly, advertisement using this DM can be flourished.

Figure 3:
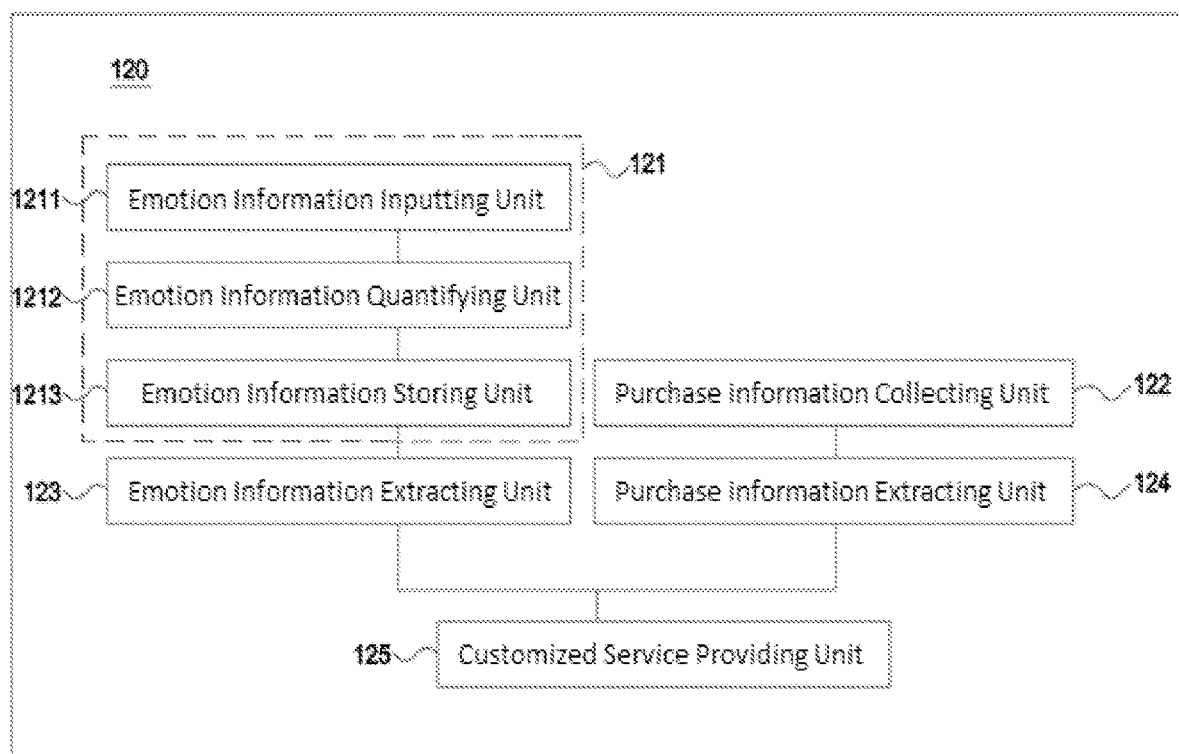
FIG. 3 is a drawing illustrating a storage unit 120 according to the present invention.

FIG. 3 is a drawing illustrating a storage unit 120 according to the present invention.

Referring to FIG. 3, the storage unit 120 includes an emotion information collecting unit 121, a purchase information collecting unit 122, an emotion information extracting unit 123, a purchasing information extracting unit 124, and a customized service providing unit 125.

The emotion information collecting unit 121 collects and accumulates emotion information of a client who use the client terminal 200. For example, the emotion information of the client may be a personality trait such as very arrogant, arrogant, slightly arrogant, average, slightly humble, humble, very humble, etc. For example, the emotion information of the client may be an attitude characteristic such as very fussy, fussy, slightly fussy, normal, slightly comfortable, comfortable, very comfortable, etc. Furthermore, the emotion information of the client may be an conversational characteristic such as very egocentric, egocentric, slightly egocentric, normal, slightly considerate, considerate, very considerate, etc. In addition, if a characteristic can reflect any emotion of the client, it can be included in the emotion information.

In this instance, the emotion information collecting unit 121 may internally collect emotion information through an online questionnaire, receive emotion information from a surveyor who has acquired client's emotion information through a face-to-face questionnaire, or collect emotion information input to an emotion information input terminal such as a terminal of a telemarketer, and may accumulates emotion information of client by storing the collected emotion information.

The purchase information collecting unit 122 collects and accumulates purchase history regarding products or services information that a client purchases. For example, the purchase information collecting unit 122 may collect a product or service purchase history by input from a terminal of a product or service provider such as a department store or a financial institution, and may store and accumulate information regarding the collected product or service.

The emotion information extracting unit 123 derives the emotional characteristics of the corresponding client based on the emotion information of the client accumulated by the emotion information collecting unit 121. The emotional characteristic of the client may be, for example, an emotional type. For example, the emotion information extracting unit 123 searches the emotion information of the client from the emotion information collection unit 121, which has accumulated the emotion information of the client, and extracts emotional characteristics of the client based on the searched emotion information of the client. In addition, the emotion information extracting unit 123 may be embodied to extract emotional characteristics of the client by determining the emotional type of the client. The emotional type may be determined by numerically quantifying the emotion information accumulated so far and averaging all the quantified emotion information. In addition, the emotion information extracting unit 123 may be embodied to extract emotional characteristics of the client by determining the emotional type based on month or season. These emotional characteristics based on month or season may be derived by averaging the numerically quantified emotion information generated during certain month or season. If the emotion information of the client is a personality characteristic, the emotional characteristic may be any one of very arrogant, arrogant, slightly arrogant, average, slightly humble, modest, and very humble. In addition, if the emotion information of the client is an attitude characteristic, the emotional characteristic may be any one of very fussy, fussy, slightly fussy, normal, slightly comfortable, comfortable, and very comfortable. Additionally, if the emotion information of the client is a conversational characteristic, the emotional characteristic may be any one of very egocentric, egocentric, slightly egocentric, average, slightly considerate, considerate, and very considerate.

The purchase information extracting unit 124 derives purchase preference characteristics of the corresponding client based on purchase history information such as a product or service of the corresponding client, which has been accumulated by the purchase information collecting unit 122. In this case, the purchase preference characteristic of the client is quantified information by evaluating and ranking the client's interest in each type of product or service. For example, the purchase information extracting unit 124 may be embodied to search the product or service purchase history of the client from the purchase information collecting unit 122, and to extract purchase preference characteristics of the corresponding client based on the searched service purchase history.

The customized service providing unit 125 provides services to the client based on the emotional characteristics of the client, which is extracted by the emotion information extracting unit 123, and the purchase preference characteristics of the client, which is extracted by the purchase information extracting unit 124. That is, the customized service providing unit 125 provides services corresponding to the emotion and purchase history of the client registered in the client terminal 200.

As described above, the present invention can provide a differentiated service according to the emotional type of the client based on the client's emotional information, and a screen interface capable of remote control to the client terminal 200. This allows clients to use concierge service easily and conveniently under the instigation of the concierge service operator.

As a more preferred embodiment of the present invention, the emotion information collection unit 121 may include an emotion information inputting unit 1211, an emotion information quantifying unit 1212, and an emotion information storing unit 1213.

The emotion information inputting unit 1211 is a user interface for inputting the emotional information. For example, the emotion information inputting unit 1211 may be embodied in the form of a web page that performs a survey for a client to input emotion information or a screen interface that receives an emotional information, which is input through separate emotion information inputting terminal.

The emotion information quantifying unit 1212 categorizes emotion types by analyzing the input emotion information of the client through the emotion information inputting unit 1211, and numerically quantifies the emotion information according to the classified emotion type. For example, the emotion information inputting unit 1211 is a user interface for inputting personality characteristics. The list of personality characteristics provided by the emotion information inputting unit 1211 may be 'very arrogant', 'arrogant', 'slightly arrogant', 'normal', 'slightly humble', 'humble', 'very humble'. One of these may be selected through the emotion information inputting unit 1211 to receive emotional information, and a score according to the emotional type is prestored in a table. In this case, when any one of these 'very arrogant', 'arrogant', 'slightly arrogant', 'normal', 'slightly humble', 'humbly', and 'very humble' is selected and input as a personality characteristic through the emotion information inputting unit 1211, the emotion information quantifying unit 1212 analyzes the input emotion information to classify the emotional type, numerically quantifies the emotion information according to the classified emotional type, and gives a score on the emotional information. Therefore, it is possible to quantify the emotion information and assign a score based on the emotion information.

The emotion information storing unit 1213 stores the client's emotion information quantified numerically by the emotion information quantifying unit 1212. In this case, the emotion information storing unit 1213 is embodied to accumulate and store the numerically quantified emotion information in the emotion information database whenever the client's emotion information is numerically quantified by the emotion information quantifying unit 1212.

Figure 4:
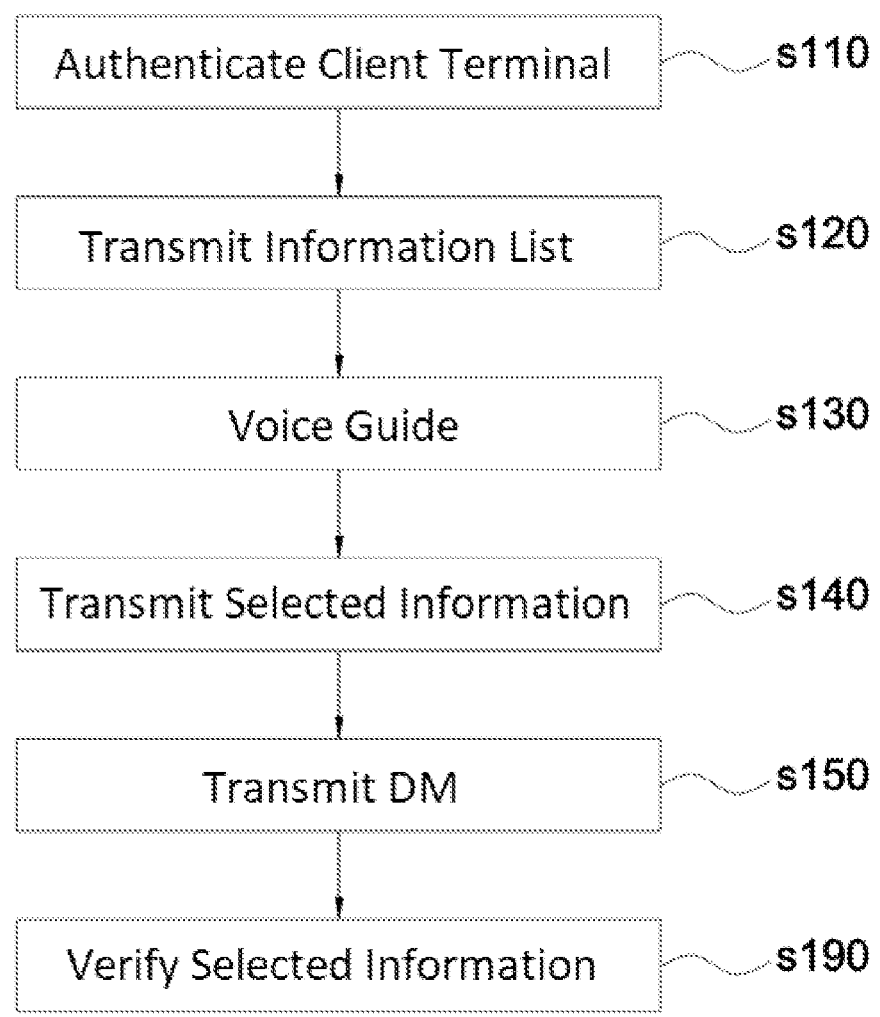
FIG. 4 is a flow chart illustrating a method for providing information according to the present invention.

FIG. 4 is a flow chart illustrating a method for providing information according to the present invention.

The method for providing information according to the present invention includes an authentication step s110, a first transmission step s120, a guide step s130, a second transmission step s140, and a third transmission step s150.

The authentication step s110 is a step of receiving information of the client terminal 200 and confirm whether a client who uses the client terminal 200 is registered as a member. This step is to prevent from providing indiscriminate information. In the authentication step s110, the client terminal 200 and the authentication unit 110 are connected to each other. The authentication unit 110 provides a user interface for inputting user ID and password to the client terminal 200. When a user ID and password are input in the user interface through the client terminal 200, the authentication unit 110 searched a prestored member DB to confirm whether a client corresponding to the input user ID and password exists. In this instance, the member DB may be separately provided or stored in the authentication unit 110.

When the client authentication through the client terminal 200 is completed in the authentication step s110, a first transmission step s120 is performed. In the first transmission step s120, the storing unit 120 transmits a list containing the information the client wants to use to the client terminal 200. In detail, the first transmission step s120 is a step of providing an option so that the client can select the information that he or she wants to use. In the first transmission step s120, the storing unit 120 provides a list of concierge services to the client terminal 200 authenticated by the authentication unit 110 so that the client terminal 200 can select the information.

In the guide step s130, when certain concierge information is selected through the client terminal 200, the operation terminal 300 provides a voice guidance to the client terminal 200 through a voice call for the selected information. In the second transmission step s130, the client terminal 200 and the operation terminal 300 are voice-connected by the connection unit 130, and the operation terminal 300 provides the voice guidance for the information selected through the client terminal 200. With the voice guidance, the client can learn more detailed explanation of the selected information, and receive help in their selection. In this case, the connection unit 130 may function as an exchange device for a voice call connecting between the client terminal 200 and the operation terminal 300, in a method of an internet calling or a method of mobile communication.

The second transmission step s140 is provided to transmit the selected information to the client terminal 200 through the client terminal 200. In the second transmission step s140, the guide unit 140 provides a remote control screen interface. In addition, when information is selected by the client terminal 200, a prestored client program for executing the remote control screen interface is transmitted and installed on the client terminal 200, and the remote control screen interface is executed through this program. Accordingly, the client can more easily obtain the concierge-related information through the visually provided screen interface.

The third transmission step s150 is a step of transmitting a DM to the client terminal 200. Specifically, in the third transmission step s150, a DM is transmitted to the client terminal 200 through the DM processing unit 150. The DM processing unit 150 includes the advertisement selecting unit 151 as described above, and the advertisement selecting unit 151 selects advertisements to be included in the DM based on the advertisement circulation rule including the first rule, the second rule, and the third rule. In addition, the DM creating unit 153 generating a DM to be transmitted to the client terminal 200. Then, the DM outputting unit 154 visually outputs the DM, and the DM transmitting unit 155 transmits the DM to the client terminal 200. In this instance, the third transmission step s150 includes a first advertisement including step s151 that includes advertisements to the DM through the first rule mentioned above, a second advertisement including step s152 that includes advertisements to the DM through the second rule, and a third advertisement including step s153 that includes advertisements to the DM through the third rule.

As a more preferred embodiment, the present invention further includes an emotion information collecting step s160, a purchase information collecting step s170, and the customized service providing step s180 after the third transmission step s150.

Figure 5:
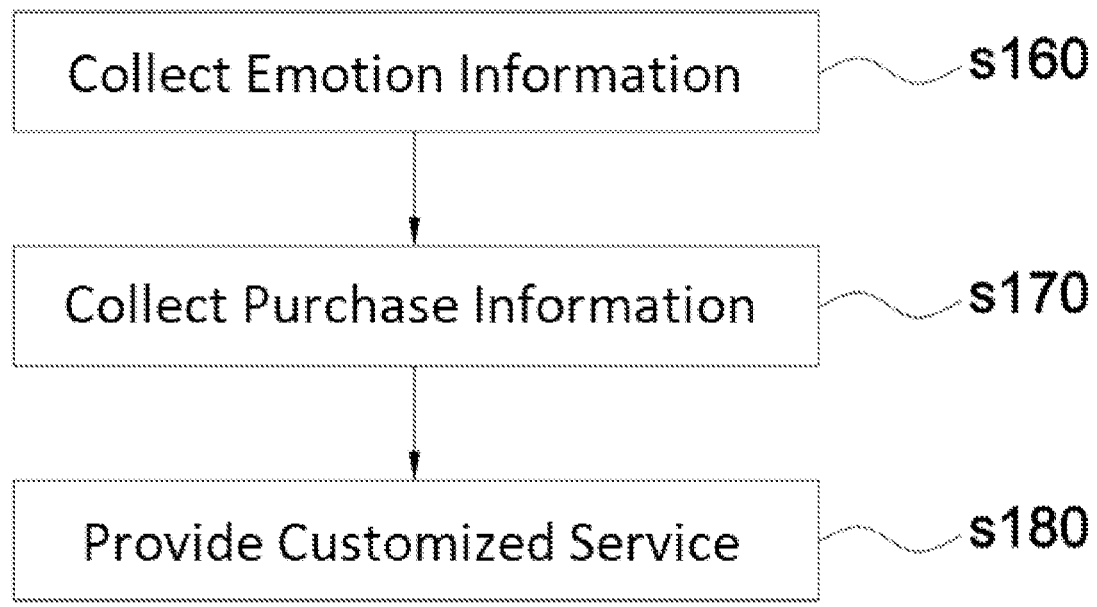
FIG. 5 is a drawing illustrating an emotion information collecting step, a purchase information collecting step, and a customized service providing step.

Referring to FIG. 5, the emotion information collecting step s160 is a step of acquiring emotion information of the client, who uses the client terminal 200, through the emotion information collecting unit 121. In detail, the emotion information collecting step s160 is for providing a customized service in a customized service providing step s180, which will be described later. The emotion information collection unit 121 provided in the storing unit 120 is connected to the operation terminal 300 and the client terminal 200. In addition, as described above, the emotion information of the client, such as personality characteristics or attitude characteristic, is stored in the emotion information collecting unit 121 through an online questionnaire, a face-to-face questionnaire, a separate emotion information input terminal, etc.

The purchase information collecting step s170 is a step for collecting client information purchase history. In detail, purchased products or services are stored in the purchase information collecting step s170. The purchase information collecting unit 122 connected to the operation terminal 300 and the client terminal 200 collects a purchase history regarding a product or service selected by the client. For example, the purchase information collecting unit 122 may collect a client's product or service purchase history that is input from a terminal of a product or service provider such as a department store or a financial institution, and may store and accumulate the purchase history regarding the collected product or service.

The customized service provision step s180 is a step performed after the emotion information collecting step s160 and the purchase information collecting step s170. The customized service provision step s180 provides services corresponding to the client based on the emotion information acquired in the emotion information collecting step s160 and the purchase information obtained in the purchase information collecting step s170. That is, in the customized service providing step s180, a customized service providing unit 125 provides services corresponding to the emotion and purchase history of the client registered in the client terminal 200. Accordingly, the client using the client terminal 200 can be provided with information regarding the corresponding service, thereby increasing convenience.

As another embodiment, the method may further comprise a verification step s190 that verifies the selected information after the second transmission step s140. The verification step s190 is a step for increasing accuracy and reliability of the information transmitted to the client terminal 200. The client terminal 200 transmits a verification request signal regarding the selected information to the operation terminal 300, and the operation terminal 300 performs verification regarding the selected information according to the received verification request signal. Specifically, if the information can be verified through online information search, the operation terminal 300 performs a verification request to the terminal in charge of the information providing service and verification with the terminal. In this case, the terminal in charge of the information providing service may be separately provided. In addition, if the information can be verified through on-site inspection or field experience, the operation terminal 300 performs a verification request to a terminal of an agent service or information-agent linking service. In this case, the terminal of the agent service or information-agent linking service may be separately provided.

The preferred embodiments of the present invention described above are disclosed for the purpose of illustration. One skilled in the art will be able to make various modifications, changes, and additions within the spirit and scope of the present invention, and such modifications, changes, and additions should be considered to be within the scope of the claims.

One of ordinary skill in the art to which the present invention pertains, can make various substitutions, modifications, and changes without departing from the technical spirit of the present invention, and the present invention is not limited by the embodiments mentioned above and accompanying drawings.

In the exemplary system described above, the methods are described with a series of steps or blocks on the basis of a flowchart; however, the present invention is not limited to the order of the steps as described above, and some steps may occur in a different order or concurrently with other steps. In addition, one skilled in the art will understand that the steps shown in the flowchart are not exclusive, that other steps may be included, and that one or more steps of the flowchart may be deleted without affecting the scope of the present invention.

INDUSTRIAL APPLICABILITY

According to the present invention, the concierge service system enables clients to use concierge services easily and conveniently by providing concierge services to clients through a network, and enabling remote control of the screen interface provided to clients' terminals for concierge service guidance under the instigation of the concierge service operator.

What is claimed is:

1. A concierge service system providing information to a client terminal 200 of a user registered as a member, the concierge service system comprising:
   an authentication step s110 receiving information from the client terminal 200 through an authentication unit 110 to confirm membership registration;
   a first transmission step s120 transmitting an information list through a storage unit 120 connected to the client terminal 200;
   a guide step s130 guiding the information list by voice through an operation terminal 300 connected to the client terminal 200;
   a second transmission step s140 transmitting information from the information list that is selected by the client terminal 200 to the client terminal 200 through a guide unit 140 connected to the client terminal 200 wherein the guide unit 140 provides a remote control screen interface to the client terminal 200 to guide the information selected by the client terminal 200, the remote control screen interface being executed by selecting the information from the information list, and
   a third transmission step s150 transmitting a direct mail (DM) corresponding to the selected information through a DM processing unit 150 connected to the client terminal 200,
   wherein in the third transmission step s150, the DM includes selected advertisement based on a prestored advertisement circulation rule r, wherein the prestored advertisement circulation rule r includes:
   a first rule r1 exposing advertisements whose first divided value falls within a first ratio c10 in high rank, wherein the first divided value is determined by the way that an advertisement ranking based on the number of views by the client terminal 200 is divided by the total number of advertisements provided in the DM processing unit 150;
   a second rule r2 exposing advertisements whose second divided value falls within a second ratio c20 in low rank, wherein the second divided value is determined by the way that an advertisement ranking based on the number of views by the client terminal 200 is divided by the total number of advertisements excluding the advertisement selected by the first rule, and
   a third rule r3 exposing advertisements whose posting elapsed day d1 is smaller than a preset reference elapsed day d0 among advertisements excluding the exposed advertisements by the first rule r1 and second rule r2 and whose posting elapsed day 1 falls within a third ratio c10 among advertisements excluding the exposed advertisements by the first rule r1 and second rule r2.

2. The concierge service system of claim 1, after the third transmission step s150, the concierge service system further includes:
   an emotion information collecting step s160 acquiring emotion information of the client, who uses the client terminal 200, through an emotion information collecting unit 121;
   a purchase information collecting step s170 storing a product or service purchased by the client through a purchase information collecting unit 122 connected to the operation terminal 300, and a customized service providing step s180 providing services corresponding to the emotion information and the purchase information of the client registered in the client terminal 200, through a customized service providing unit 125 connected to the emotion information collecting unit 121 and the purchase information collecting unit 122.

3. The concierge service system of claim 1, further comprise a verification step s190 that verifies the selected information after the second transmission step s140.

4. A concierge service system for providing information to a client terminal 200 of a user registered as a member, the concierge service system comprising:

an authentication unit 110 confirming whether a user is registered as a member;

a storage unit 120 storing information that the user wants to use, and transmitting an information list to the client terminal 200;

a connection unit 130 providing a voice call between the client terminal 200 and an operating terminal 300, thereby enabling to provide voice guidance regarding the information to a client through the voice call;

a guide unit 140 providing information selected by the client terminal 200 from the information list wherein the guide unit 140 provides a remote control screen interface to the client terminal 200 to guide the information selected by the client terminal 200, the remote control screen interface being executed by selecting the information from the information list; and a direct mail (DM) processing unit 150 connected to the client terminal 200, and transmitting a DM corresponding to the selected information, wherein the DM includes selected advertisement based on a prestored advertisement circulation rule r, wherein the prestored advertisement circulation rule r includes:

a first rule r1 exposing advertisements whose first divided value falls within a first ratio c10 in high rank, wherein the first divided value is determined by the way that an advertisement ranking based on the number of views by the client terminal 200 is divided by the total number of advertisements provided in the DM processing unit 150;

a second rule r2 exposing advertisements whose second divided value falls within a second ratio c20 in low rank, wherein the second divided value is determined by the way that an advertisement ranking based on the number of views by the client terminal 200 is divided by the total number of advertisements excluding the advertisement selected by the first rule, and a third rule r3 exposing advertisements whose posting elapsed day d1 is smaller than a preset reference elapsed day d0 among advertisements excluding the exposed advertisements by the first rule r1 and second rule r2 and whose posting elapsed day 1 falls within a third ratio c10 among advertisements excluding the exposed advertisements by the first rule r1 and second rule r2.

\* \* \* \* \*